United States Patent [19]
Raring

[11] Patent Number: 5,803,955
[45] Date of Patent: *Sep. 8, 1998

[54] APPARATUS FOR DUST CONTROL

[75] Inventor: David L. Raring, Battleground, Wash.

[73] Assignee: The Raring Corporation, Vancouver, Wash.

[*] Notice: The term of this patent shall not extend beyond the expiration date of Pat. No. 5,713,970.

[21] Appl. No.: 892,613

[22] Filed: Jul. 14, 1997

Related U.S. Application Data

[63] Continuation of Ser. No. 580,798, Dec. 28, 1995, Pat. No. 5,713,970.

[51] Int. Cl.⁶ ............................................. B01D 47/00
[52] U.S. Cl. .............................. 96/239; 96/273; 96/356; 96/362; 55/511; 95/223
[58] Field of Search ............................ 55/223, 233, 238, 55/257.2, 257.6, 260, 413, 414, 415, 507, 511, 107, 271, 357; 95/223; 299/12; 96/239, 273, 356, 362

[56] References Cited

U.S. PATENT DOCUMENTS

| | | | |
|---|---|---|---|
| 2,737,997 | 3/1956 | Himmelheber et al. | 425/145 |
| 3,435,593 | 4/1969 | Nordone | 55/260 |
| 3,757,491 | 9/1973 | Gourdine | 55/107 |
| 4,266,951 | 5/1981 | Calvert | 55/257.6 |
| 4,334,897 | 6/1982 | Brady et al. | 55/257.2 |
| 4,380,353 | 4/1983 | Campbell et al. | 55/271 |
| 4,717,404 | 1/1988 | Fore | 55/357 |
| 5,104,194 | 4/1992 | LeBegue et al. | 299/12 |
| 5,253,925 | 10/1993 | Modzik, Jr. | 55/257.2 |

*Primary Examiner*—Jay H. Woo
*Assistant Examiner*—Minh-Chau T. Pham
*Attorney, Agent, or Firm*—Chernoff, Vilhauer, McClung & Stenzel

[57] ABSTRACT

An apparatus for controlling dust generated during a material transfer operation includes an environmental enclosure surrounding a conveyor bed, the enclosure having a series of baffles creating scrubbing chambers in which dust particles are agglomerated by a fog or mist. The baffles have ports allowing positive airflow under the influence of the moving material and of the conveyor bed so that airborne dust particles impact and adhere to the wet baffle surface. Accumulated dust in the form of a wet sludge eventually drops onto the material on the conveyor and is carried out of the system.

10 Claims, 4 Drawing Sheets

APPARATUS FOR DUST CONTROL

This application is a continuation of U.S. application Ser. No. 08/580,798 filed Dec. 28, 1995, now U.S. Pat. No. 5,713,970.

BACKGROUND OF THE INVENTION

The following invention relates to a dust control apparatus and more particularly to an apparatus for controlling the generation of dust during a material transfer operation which utilizes an environmental chamber surrounding a material transfer system and a means to agglomerate dust particles thereby preventing dust from being released into the surrounding environment.

Many industrial processes, including material handling processes, generate dust and debris. For example, mining operations in which rock or ore is pulverized and the resultant aggregate is dumped onto conveyor belts or other material handling apparatus can create fine dust particles that create health or environmental problems. This becomes especially acute as bulk materials are transferred from one type of processing equipment to a conveyor or to another type of processing equipment. What is frequently done in such cases is to remove the dust from the area where it is created by sucking the dust into a conduit or pipe and injecting water or fog into the conduit to agglomerate the airborne dust. Such a conduit may have a labyrinth formed by baffles, an example of which is shown in Toyama U.S. Pat. No. 3,888,642. The Toyama device shows a scrubber for cleaning an exhaust gas which exits a vertical pipe. Another gas scrubbing type of apparatus is shown in Brady, et al., U.S. Pat. No. 4,334,897. Like Toyama, Brady et al. uses multiple baffles to create a labyrinth through which an exhaust gas bearing contaminants must flow.

These systems, however, depend upon a source of negative pressure to deliver the effluent from the material handling area to a scrubbing chamber. As such the effluent must be drawn by fans or the like through a pipe or a flue into the scrubber. Such a system is shown in Absher, et al., U.S. Pat. No. 3,841,063. In addition to requiring a fan or pump to suck the dust into the scrubbing chamber, these systems must also have a means for processing the resultant sludge and any contaminated runoff.

In mineral processing systems where ore is placed on a conveyor or the like, open air wetting systems have been used which attempt to control dust by simply directing a spray toward a bed of material which may be moving along a conveyor. Such a system is shown in Doeksen U.S. Pat. No. 3,961,752. A variation of this type of system includes the SONIC DRY FOG™ dust suppression system from Sonic Environmental Systems, Inc. of Parsippany, N.J. which uses fine droplets of water to agglomerate dust particles. The agglomerated particles tend to settle rather than remaining airborne. This system requires compressed air and a special type of nozzle to create very fine water droplets. A drawback of this type of system is that it relies upon the airborne settling of agglomerated particles onto the material being conveyed by the material handling system. Although the system may be operated in an enclosure or in the open, the removal of airborne particles relies entirely upon settling by gravity. Another drawback of open air systems is that it is difficult to monitor the area around the material handling system for air quality. Frequently environmental regulations issued by state or federal agencies require compliance and reporting of empirical data on air quality improvement. In an open air system there is no reliable test point where efficiency of the dust removal apparatus may be measured.

SUMMARY OF THE INVENTION

The present invention provides an apparatus for controlling dust generated during a material transfer operation. It includes an environmental enclosure substantially surrounding at least a part of the material transfer operation where dust is likely to be generated for preventing the dust from escaping. Further, the apparatus includes a plurality of baffles dividing the enclosure into a series of internal agglomerating or scrubbing chambers. The baffles include holes or apertures permitting the flow of air between the internal chambers from one end of the environmental enclosure to the other. A fine mist or fog is injected into at least some of the internal chambers for agglomerating dust particles. The agglomerated dust particles impinge upon the baffles under the influence of positive air flow through the enclosure. The positive air flow is created by the movement of material along a conveyor bed that is surrounded by the enclosure. When enough agglomerated dust collects on the baffles, it eventually drops down onto the conveyor bed under the effect of gravity or the natural vibration of the apparatus.

The conveyor bed may be a moving belt, disk screen, roller bed or any other type of material handling and conveying apparatus. The enclosure may have an input end where material is deposited onto the conveyor bed and an output end at either the end of the conveyor or at some intermediate point along the conveyor. The enclosure should enclose the conveyor bed on at least three sides thereof, preferably having a top and two side walls. A dust skirt may be used to form a partial dust seal along the bottoms of the side walls where they intersect with the conveyor.

If desired, a static chamber with no agglomerating mist may be used as the last chamber in the enclosure and a test port provided for testing air quality. In this way a comparison may be made between air quality and the input end and the output end.

The foregoing and other objectives, features, and advantages of the invention will be more readily understood upon consideration of the following detailed description of the invention, taken in conjunction with the accompanying drawings.

DETAILED DESCRIPTION OF THE INVENTION

Figure 1:
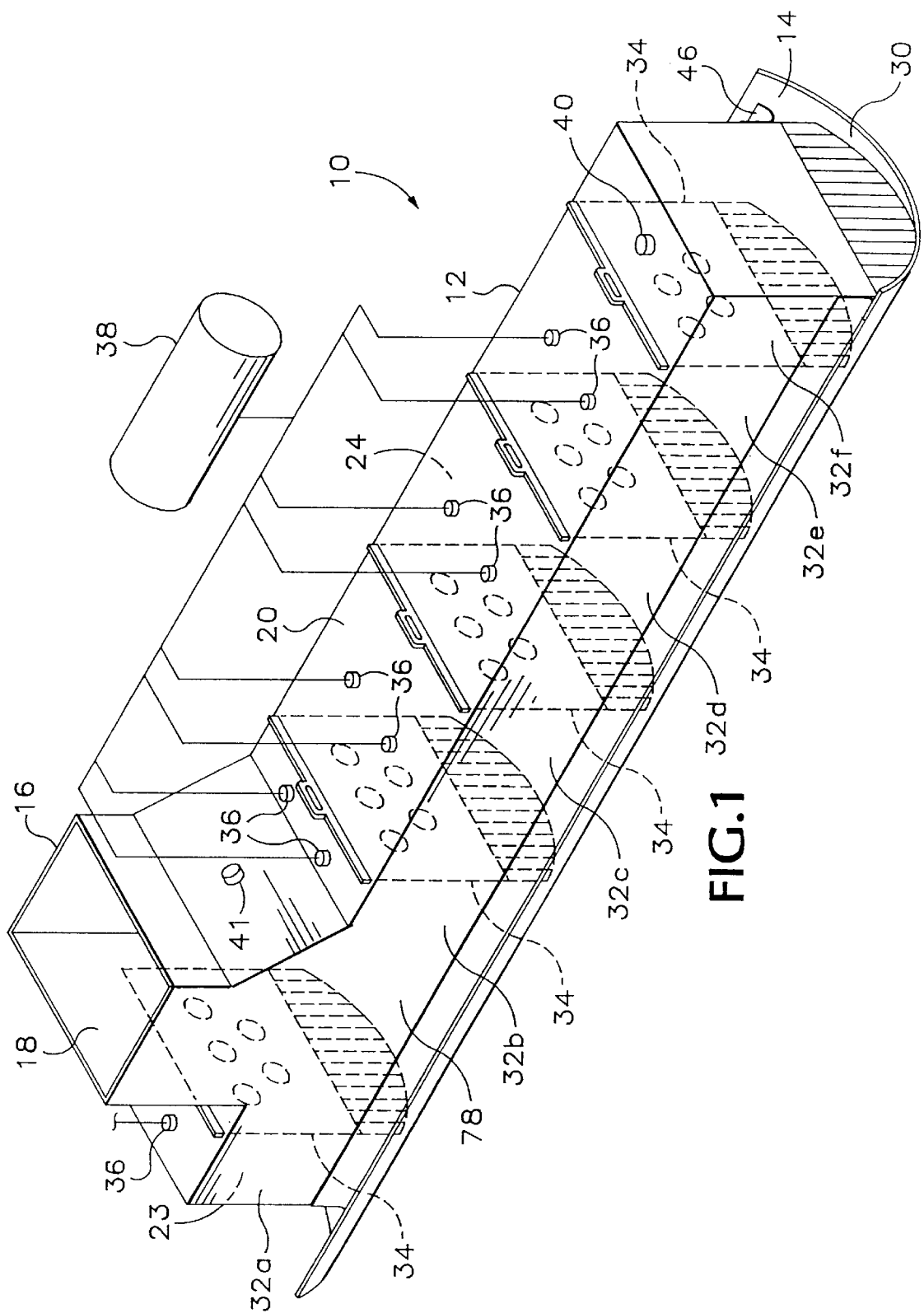
FIG. 1 is a perspective view of the dust control apparatus of the present invention installed on a conventional conveyor belt.

A dust control apparatus 10 includes an environmental chamber 12 which is an elongate enclosure placed over the top of a conveyor belt 14. The conveyor belt 14 is of the endless belt type and conveys material such as aggregate or ore deposited on the belt through a drop chute 16.

The ore or rock is dropped through the chute 16 through an entry port 18 in the enclosure 12. This event would normally cause dust to billow outward from the conveyor belt 14 contaminating the surrounding air. The enclosure 12, however, prevents this from happening since it forms an environmental seal with respect to the conveyor belt 14. The enclosure 12 has a top portion 20 and sidewalls 22 and 24 as well as a rear wall 23. The location of the drop chute 16 is at an input end 28 of the enclosure 12 and the enclosure extends along the belt 14 to an output end 30 which may be located either at the end of the conveyor belt 14 or at some intermediate point along it.

Since the conveyor belt 14 is moving as the aggregate material is dropped onto it, a positive airflow flowing from the input end 28 of the enclosure to its output end 30 is created.

The enclosure 12 is separated into a series of discrete scrubbing chambers 32a, 32b, 32c, 32d and 32e and a static chamber 32f. These chambers are created by baffles 34 which form adjoining walls. The baffles 34 create zones where dust particles may be agglomerated so that the dust is removed from the air and falls back onto the material flowing along the conveyor belt 14. Chamber 32a also includes an end wall 23 which prevents dust from escaping to the rear of the drop chute 16. In addition, the volume of the rear chamber 32a lowers the pressure immediately beneath the chute 16 by absorbing some of the dust laden air as it flows beneath the back baffle 34. Some of this air is bled back into chamber 32b through holes 45 in the baffle. A dust-tight skirt board 46 having a curved piece of resilient material may be attached to the side walls 24 and 22, respectively, to create at least a partial dust seal with respect to the conveyor belt 14 so that no dust escapes along the edges of the conveyor belt into the surrounding environment.

Agglomeration is caused by mist or fog-producing nozzles 36 which release a fine mist into each of the scrubbing chambers 32a–32e. Liquid is pumped from a reservoir 38 which provides enough pressure to create a mist or fog whose droplet size is selected to cause agglomeration of the dust rising from the conveyor bed 14. A fraction of the total water injected proportional to the amount of airborne dust should have droplet sizes in the range of 1–30 microns in diameter. As the dust is agglomerated, it impinges upon the baffles 34 as a wet sludge, and under the effect of gravity or the natural vibratory action of the conveyor belt 14, this sludge eventually falls off of the baffles onto the material below. Since it is now sludge and not an airborne dust, the air at the output end 30 of the enclosure 12 will be substantially free of particulate environmental contaminants.

Positive airflow between the chambers 32b–32f is permitted by holes or apertures in each of the baffles 34 and by a fringe portion 47 at the bottom of each baffle which also permits material flow under the baffles. Air pressure is highest at the input end of the enclosure in chamber 32b, but due to the sizing and placement of the holes 45 in the baffles 34, it drops progressively from the input end 28 to the output end 30. Proper pressure differentials between the internal chambers insures a positive airflow toward the output end 30 from the drop chute 16 without causing back pressure which would otherwise tend to push dust laden air back up the drop chute 16. The requisite positive air flow is caused by having either larger or more holes in the baffles 34 near the input end 28 and by making the overall aperture area smaller toward the output end.

By the time the airstream flowing through the holes reaches the static end chamber 32f it should be substantially free from dust. Thus chamber 32f may include a test port 40 which may be used for environmental testing. Another test port 41 is located in chamber 32b. In this way the efficiency of the dust removal operation may be empirically determined by comparing the air quality present at chamber 32b, which is directly underneath the drop chute 16, and the static test chamber 32f.

Figure 2:
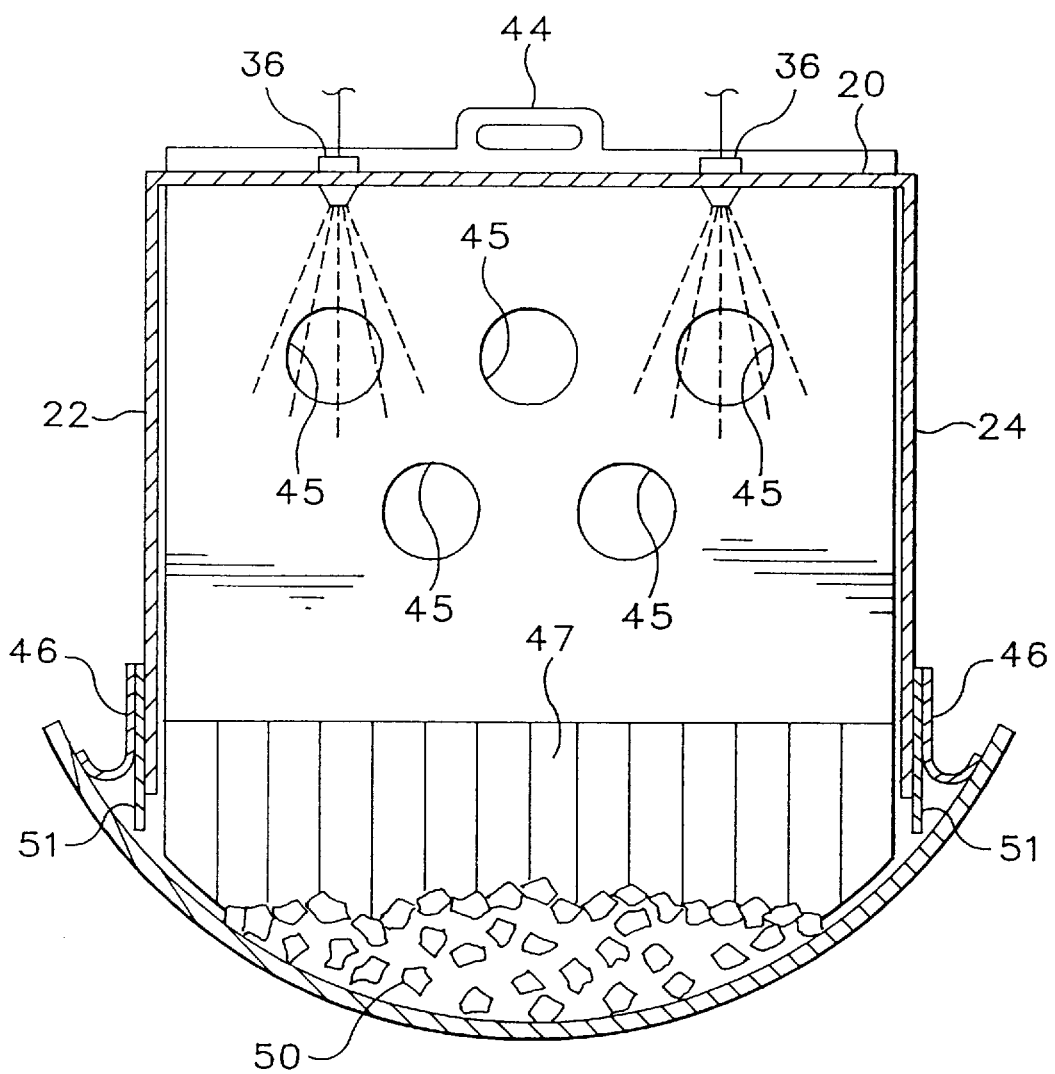
FIG. 2 is a partial front cutaway view of the enclosure of FIG. 1 showing the structure of a baffle used in the invention.

Referring now to FIG. 2, each of the baffles 34 may be selectively removed from the enclosure 12 by a handle 44. The baffle 34 may be made of a sheet of flexible material such as rubber. Each baffle 34 includes a plurality of air distribution ports 45 in an upper portion and a set of slits or vents in the lower part of the baffle creating a fringe 47 that hangs down onto the belt conveyor 14 and allows the material 50 on the conveyor to pass underneath. The apertures 45 should constitute about 5–20% of the cross sectional area of each baffle 34. Two to four inch diameter holes are generally adequate for creating enough positive airflow between the internal chambers 32a–32f without causing appreciable back pressure.

Figure 3:
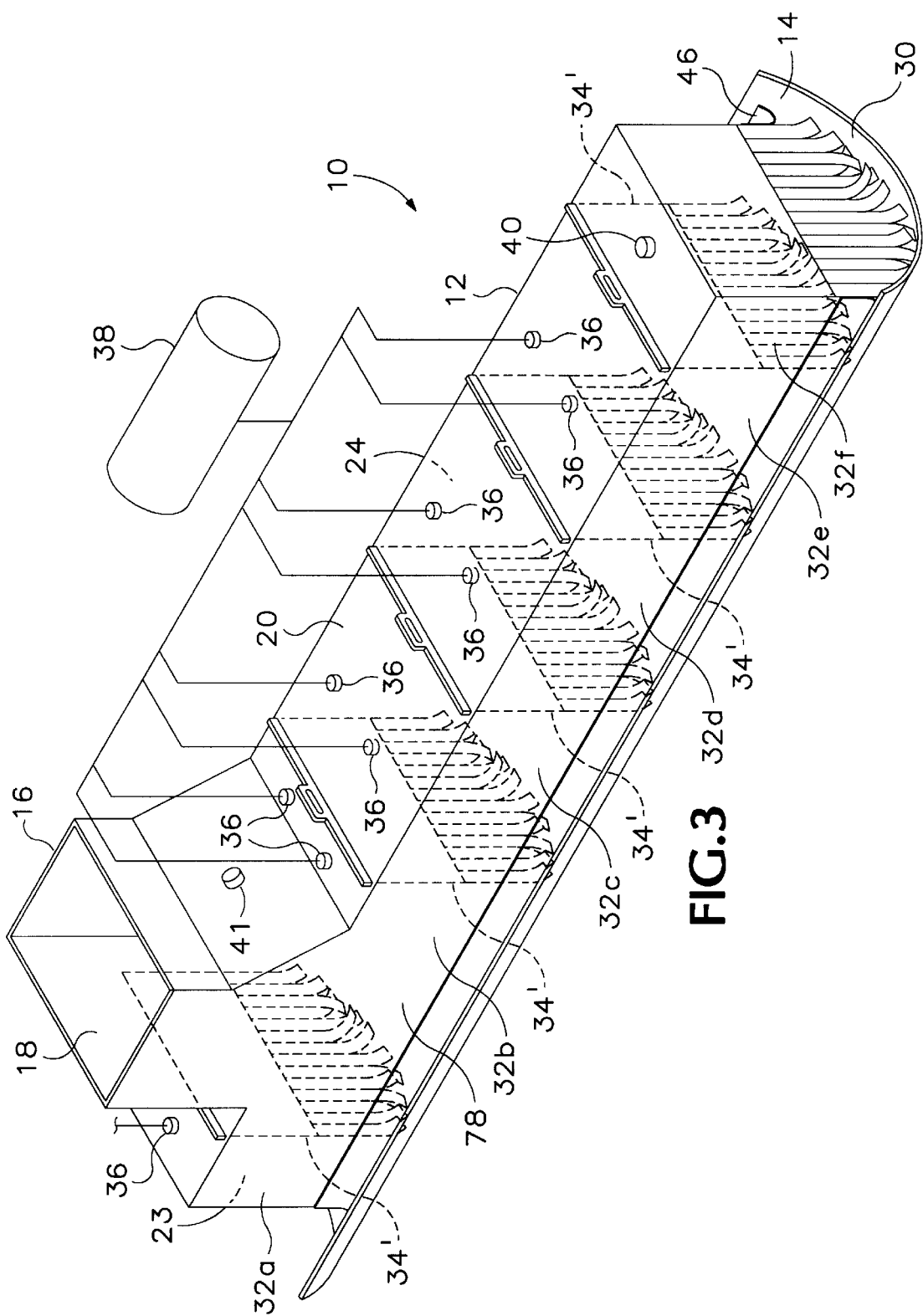
FIG. 3 is a perspective view of an alternative preferred embodiment of a dust catcher according to the present invention installed on a conventional conveyor belt.
Figure 4:
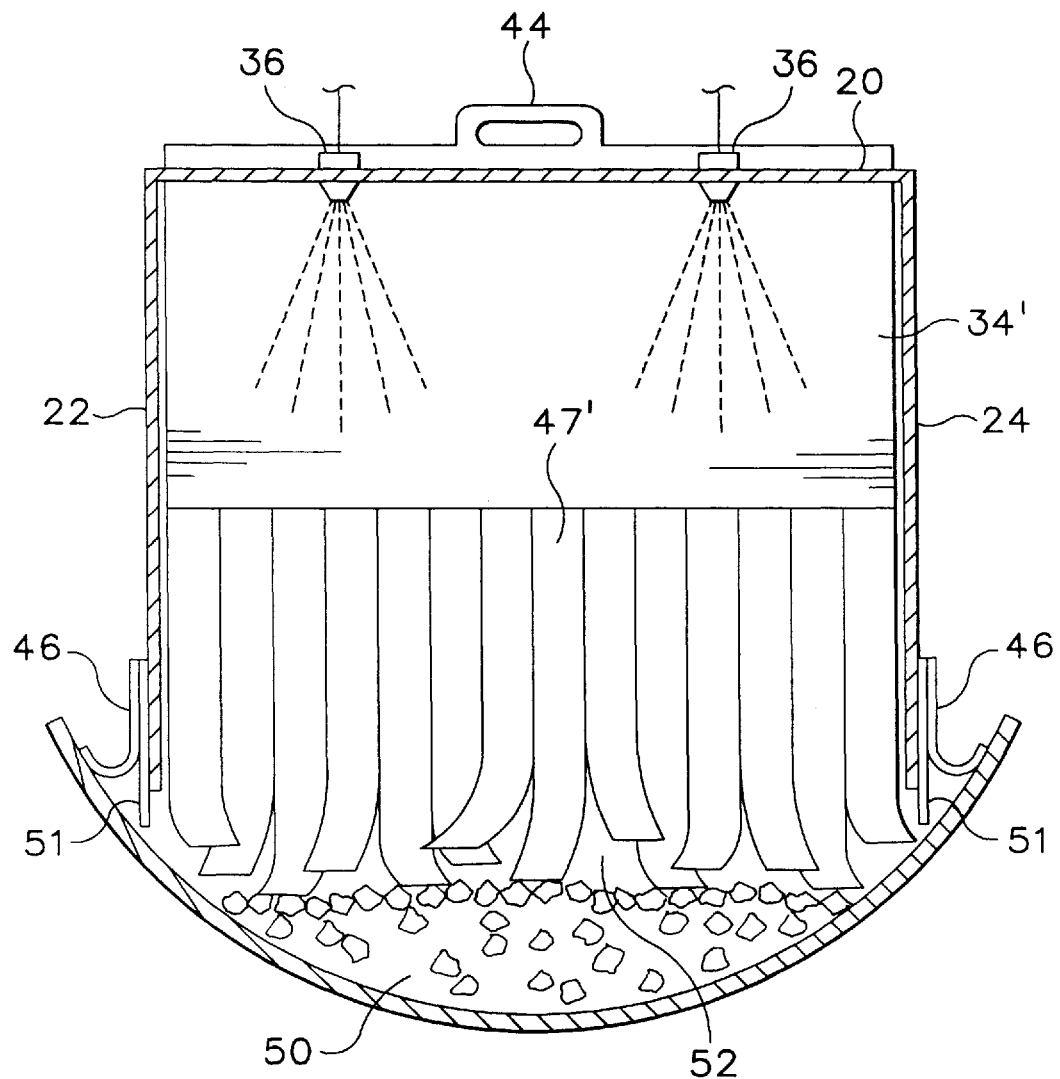
FIG. 4 is a partial front cutaway view of the enclosure of claim 3 showing the structure of a baffle used in the invention.

Referring to FIGS. 3 and 4, there may be installations, that do not require that the baffles have holes. In such cases there may be enough space under the baffles and around the sides that provides for sufficient air flow through the system. In such a case the baffles 34' may be non-perforated walls between chambers with a slitted fringe 47' at the bottom defining vents 52 to permit material and air flow.

In actual operation, dust laden air under pressure caused by the impact of the material 50 on the conveyor belt 14 moves from chamber 32b to chamber 32a under the bottom of a baffle 34. As the air enters chamber 32a, the pressure is quickly reduced by the volume of that chamber. In addition the apertures 45 in the top portion of the baffle bleed the air back into the lower pressure upper portion of chamber 32b. Fog may be injected into chamber 32a by a nozzle 36. In addition the back wall 23 prevents dust from escaping.

The conveyor belt 14 moves the material 50 from chamber 32b progressively through adjacent chambers 32c, 32d, 32e, 32f and eventually out of the system. The lower fringed portions 47 of each baffle 34 allow the material to flow without restriction but do provide a resistance to the natural induction of airflow caused by the rough surface of the material. This airflow resistance causes a reduction in the total airflow that moves through the system.

Apertures 45 cut in the upper portion of each baffle 34 allow the air that is pulled into chamber 32b to flow progressively through the system. Chamber 32b is under positive pressure and depending upon the volume of material, its size, distribution and the height of chute 16, among other factors, this pressure must relieve itself back up the chute or out through the system. The apertures 45 in the baffles 34 balance that back pressure so that the pressure in the chute 16 feeding the system becomes nearly zero allowing the flow of air through the system to the output end 30 without causing airflow back out the chute 16 that may carry dust into the surrounding environment. This is accomplished by providing a cascading pressure drop from chamber 32b through chamber 32f. Air velocities through the holes 45 in the baffles 34 are lower between, for example, chamber 32b and 32c, than between chamber 32d and 32e. Thus, there may be either smaller or fewer holes in the baffles separating the "upper" chambers 32d, 32e and 32f than those separating the "lower" chambers 32b and 32c.

The fog dispensed through nozzles 36 into the various internal chambers impact with dust particles and causes those particles to settle onto the material 50 moving along the conveyor bed 14. Dust that remains airborne can impact a downstream baffle which is damp or wet due to previous collisions of water droplets or agglomerates. The wetness causes the dust and agglomerates to adhere to the surface of the baffle until the buildup becomes heavy enough to fall onto the material 50 or until the natural vibration of the system or impact of the material flow with the bottom of a baffle causes it to dislodge and fall onto the material and thus be conveyed out of the system. By the time the airstream reaches static chamber 32f most of the dust should be removed. The quality of the air may be tested at test point 40 and compared with the air quality at test point 41 in chamber 32b to empirically determine the efficiency of the system.

In an alternate embodiment, intermediate half baffles without ports may be installed between certain of the baffles 34 such that the airflow is caused to take a longer flow path. These half baffles would hang down from the top wall 20 and eliminate line of sight flow between the apertures in one baffle and those in the next downstream baffle. The fog-generating nozzles 36 would be installed between the upstream baffle and the half baffle. This enhancement to the system would cause more turbulence in the airflow, enhance the agglomeration effect and provide an extra dust collection surface.

The invention may also be used in situations in which the dust is not being directly conveyed away from the source. Cases such as these include conveyor systems or loader dumping operations into a bin or a hopper. In such cases the environmental chamber of the invention may simply surround the impact area where dust is likely to be generated.

The terms and expressions which have been employed in the foregoing specification are used therein as terms of description and not of limitation, and there is no intention, in the use of such terms and expressions, of excluding equivalents of the features shown and described or portions thereof, it being recognized that the scope of the invention is defined and limited only by the claims which follow.

What is claimed is:

1. An apparatus for controlling dust in a material transfer operation comprising:
    (a) a conveyor system having a conveyor bed for moving material;
    (b) an enclosure at least partially surrounding the conveyor system, said enclosure having at least a top and two sidewalls, said enclosure being segmented into a plurality of scrubbing chambers by baffles having vents for permitting air flow between said scrubbing chambers; and
    (c) a fog generator for directing fine liquid droplets into at least one of said chambers to agglomerate the dust created by material flow on said conveyor system.

2. The apparatus of claim 1 wherein fog is directed into at least some of said plurality of scrubbing chambers.

3. The apparatus of claim 1 wherein said baffles comprise flexible sheets having bottom strips defining said vents therebetween and which hang down onto said material moving on said conveyor bed.

4. The apparatus of claim 1 wherein said enclosure includes a dust skirt extending adjacent to said conveyor bed for forming at least a partial dust seal with respect thereto.

5. The apparatus of claim 1 wherein said baffles comprise sheets of flexible material supported by said enclosure, each of said sheets having a bottom fringe portion comprising a plurality of strips hanging down and approximately contacting said material as said material moves along said conveyor bed.

6. An apparatus for controlling dust generated during a material transfer operation comprising:
    (a) a chute for grinding dust-producing material onto a conveyor apparatus;
    (b) an enclosure having an input end adjacent said chute and an output end;
    (c) a plurality of baffles dividing said enclosure into a series of internal scrubbing chambers, said baffles including vents permitting a positive airflow between said internal scrubbing chambers from said input end to said output end; and
    (d) a source of liquid spray for injecting spray or mist into at least some of said internal chambers for wetting the surfaces of the baffles.

7. The apparatus of claim 6, further including a conveyor bed and wherein said enclosure forms an environmental chamber around at least three sides of said conveyor bed.

8. The apparatus of claim 6 wherein said baffles include a plurality of flexible strips along a bottom portion thereof overhanging said conveyor bed for permitting material and said conveyor bed to pass from one internal chamber to the next.

9. The apparatus of claim 6 wherein said source of liquid spray comprises a plurality of nozzles, one nozzle projecting into each one of said internal scrubbing chambers.

10. The apparatus of claim 6, further including a static chamber having a test port.

* * * * *